United States Patent
Dahlquist et al.

[15] 3,698,423
[45] Oct. 17, 1972

[54] VALVE UNIT FOR VACUUM OPERATED PALLETIZER LIFTING HEADS

[72] Inventors: Ernst A. Dahlquist, Grand Rapids; Stanley J. Polakowski, Kalamazoo; Teunis Vaalburg, Ann Arbor, all of Mich.

[73] Assignee: Rapistan Incorporated, Grand Rapids, Mich.

[22] Filed: Sept. 4, 1970

[21] Appl. No.: 69,688

[52] U.S. Cl. ............... 137/454.2, 137/519, 137/526, 137/525, 137/512.1, 294/64 R
[51] Int. Cl. .......................... F16k 15/02, F16k 15/14
[58] Field of Search.294/64 R, 65; 137/454.2, 454.4, 137/454.6, 512.1, 519, 526, 525

[56] References Cited

UNITED STATES PATENTS

| | | | |
|---|---|---|---|
| 2,011,088 | 8/1935 | Shindel | 137/525 |
| 2,960,364 | 11/1960 | Herzog | 294/65 |
| 2,970,608 | 2/1961 | Doeg | 137/525 X |
| 3,109,451 | 11/1963 | Mihalakis | 137/525 X |
| 3,123,096 | 3/1964 | Notaro et al. | 137/525 |
| 3,523,707 | 8/1970 | Roth | 294/65 |

*Primary Examiner*—Robert G. Nilson
*Attorney*—Price, Heneveld, Huizenga & Cooper

[57] ABSTRACT

A valve unit adapted for insertion in an air passage opening through the grid of a vacuum operated palletizer lifting head having a rectangular body with a pair of elongated faces on opposite sides thereof and a generally central aperture therethrough between the elongated faces to permit air to pass through the body. The body has in one of its elongated faces a concave valve seat surrounding the aperture. The valve unit also has a valve member and means movably supporting the same on the body adjacent the valve seat, the valve member being a thin, resilient element adapted to be flexibly shiftable between an open position spaced from the valve seat and a closed position seated against the valve seat and shaped to conform to the concavity thereof. Means are provided around the periphery of the body for forming a seal between the body and the grid of the palletizer.

6 Claims, 9 Drawing Figures

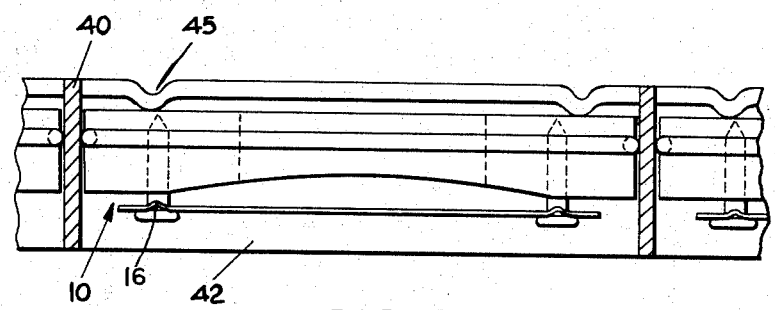
FIG. 8
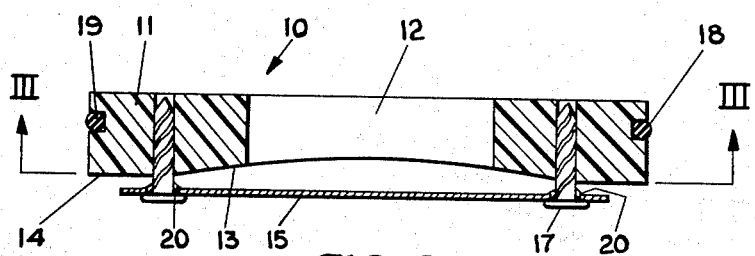
FIG. 2
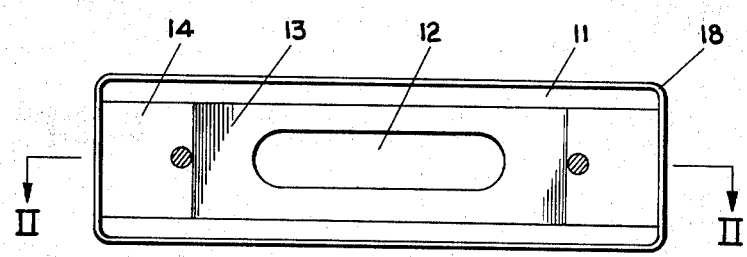
FIG. 3
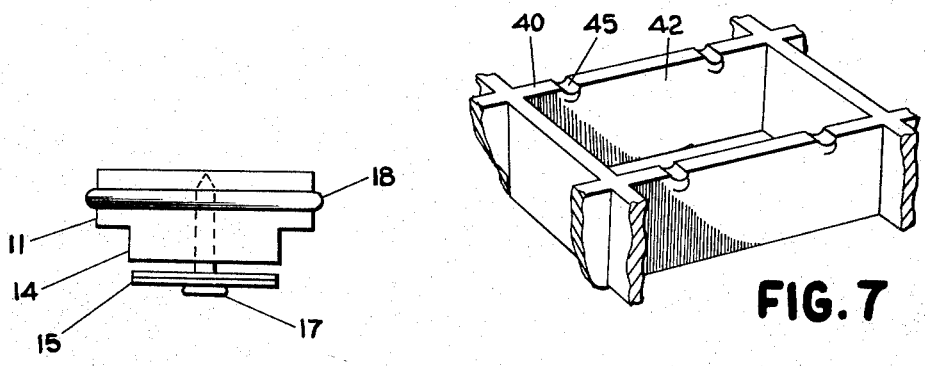
FIG. 4
FIG. 7
INVENTORS
ERNST A. DAHLQUIST
STANLEY J. POLAKOWSKI
TEUNIS VAALBURG
BY
ATTORNEYS 3,698,423

VALVE UNIT FOR VACUUM OPERATED PALLETIZER LIFTING HEADS

BACKGROUND OF THE INVENTION

This invention relates to vacuum operated palletizers and, more particularly, to improved valve devices for use therein.

In the palletizer art, articles such as case goods are automatically arranged on a conveyor surface in groups and then, by a head having vacuum creating equipment, the articles as a group, are lifted from the conveyor surface and loaded onto a pallet. Such a group of articles is called a tier and a number of tiers are stacked, one upon another, to form a pallet load. This system works satisfactorily when the articles are such that the articles in every tier can be so arranged that the tier's perimeter has the same dimensions and geometry and no internal chimneys or voids exist within the tier. However, for stability of the pallet load, alternate tiers should have different patterns so that the articles of one tier overlap the articles of the tier on which it rests. This ties the load together. Frequently, internal chimneys are formed which are in different positions in each tier. The problem of non-identical tier geometry occurs under some operating circumstances when the same palletizer is used, first for articles of one size and shape and then for articles of another size and shape.

Conventionally, the vacuum lift heads of palletizers are built to have an over-all intake opening sized to fit the tier of greatest perimeter. The opening is normally subdivided by a grid or other means into a plurality of subopenings or individual air passages. Certain groupings of articles leave substantial areas at the perimeter of the tier which are not covered by the articles. Also the chimneys remain open. Often the volume of air which can enter through these unused openings is so great that the head must have excessive air pumping capacity to create sufficient vacuum to lift the articles. In some cases, even this expedient is inadequate. Such an arrangement is initially expensive and bulky. It is also both expensive and noisy to operate. Further, even with excessive air pumping capacity, the equipment can only handle relatively minor variations in tier size.

To overcome these problems, various devices have been employed including flexible curtains which close in around the sides of the articles. This system works reasonably well if the shape of the perimeter is reasonably regular and does not involve any significant indentations or recesses. It does not solve the problem of internal chimneys.

Another solution has been the use of individual valves, shaped somewhat like cuff-links, located in the individual air passages. These remain closed until opened by contact with the articles. These have not been entirely satisfactory. To prevent them from opening in response to the vacuum alone, they have to be heavy and their weight pressing down on the articles is added to that of the articles. In effect, this reduces the efficiency of the equipment by reducing its pay-load capacity, collectively, the weight of these valves represents a substantial reduction in equipment capacity. Also, should the edge of an article happen to contact the valve and open it, even though the article is closing off only a relatively small portion of the entire air passage, large volumes of air are allowed to enter. When a number of valves are so affected, the capacity of the equipment is seriously impaired.

In co-pending, co-assigned application Ser. No. 781,823, filed Dec. 6, 1968, now U.S. Pat. No. 3,598,439, an improved vacuum operated palletizer lifting device is disclosed which solves these problems. The device consists of a lifting head having a primary chamber from which air is exhausted, the bottom of which is formed by a grate creating a number of small individual air passages. A number of these individual air passages are equipped with individually operable valves which open and close in response to a predetermined amount of air pressure differential across the valves. The valves close to shut off the flow of air into the primary chamber through those individual air passages not closed off by the articles to be lifted. However, as these valves are permanently mounted in the grate, a large number are required in order to be useful with tiers differing greatly in tier geometry, i.e., tier perimeter and chimney locations. Furthermore, these valves add significantly to the cost and complexity of manufacture of the palletizer heads since not only must the valves be permanently mounted, but also the heads must be customized as to valve locations for the anticipated range of tier perimeters and chimney locations for which the palletizer will be used. While valves could be mounted in all or most of the grate air passages to accommodate any chimney locations or greatly varying tier perimeters, this would be impractical and unduly expensive as well as decreasing the lifting capacity of the lifting head.

Accordingly, it would be desirable to eliminate these disadvantages of the above device while still maintaining its utility for solving the problem in the art associated with non-identical tier geometry.

SUMMARY OF THE INVENTION

According to the present invention there is provided an improvement in vacuum operated palletizers which comprises a valve unit adapted to be easily inserted in or removed from the grid air passages in the lifting heads of such palletizers, and which opens and closes in response to a predetermined amount of air pressure differential across the valve. These valve units, which can be inexpensively, uniformly mass produced, can be easily inserted in palletizer lifting head grids just prior to use in arrangements to accommodate anticipated tier perimeters and chimney locations and can be easily relocated when tier perimeters or chimney locations change greatly. Thus, a minimum number of valve units can be used for each palletizer head and can be rearranged easily when necessary rather than having to provide a great number of permanently installed valves to accommodate all possible tier geometries. The novel valve unit comprises a body of rectangular configuration having a pair of elongated faces on opposite sides thereof and a generally central aperture therethrough between the elongated faces to permit air to pass through the body, the body having in one of the elongated faces thereof a concave valve seat surrounding the aperture. A thin, resilient valve member is movably supported on the body adjacent the valve seat adapted to flexibly shift between an open position spaced from the valve seat and a closed position seated against the valve seat shaped to conform to the concavity of the valve seat. Surrounding the body around the faces adjacent the two elongated faces are means, preferably an elastic O-ring, for forming a seal between the body and the palletizer head grid surrounding each air passage defined by it when the valve unit is inserted in the grid.

Valves are inserted in the perimetrical areas of the grate according to the anticipated range of tier perimeters and in those areas where chimneys may be formed. When the palletizer is operated, all of the air passages are not closed by the presence of an article are automatically closed off by the valves. This permits the vacuum lift head automatically to adjust the over-all shape of its air intake to that of the tier of articles and to limit its air intake only to those air passages covered by the presence of an article. The construction of the valve is such that it adds substantially no weight to the head, applies no load to the articles acting against the effect of the vacuum and is positive in its closing action when the required air pressure differential is attained. When tiers are to be moved with perimeters or chimney locations differing from those provided for, the valves can be easily and quickly relocated or valves added or removed.

BRIEF DESCRIPTION OF THE DRAWINGS

FIG. 2 is a sectional elevation view of a valve unit with valve taken along the plane II—II of FIG. 3;

FIG. 3 is a bottom view of a valve unit without valve;

FIG. 4 is an end view of a valve unit;

FIG. 7 is a fragmentary, top oblique view of a section of the grid of the lifting head of FIG. 5;

FIG. 8 is an enlarged sectional elevation view taken along the plane VIII—VIII of FIG. 6.

DESCRIPTION OF THE PREFERRED EMBODIMENTS

Figure 1:
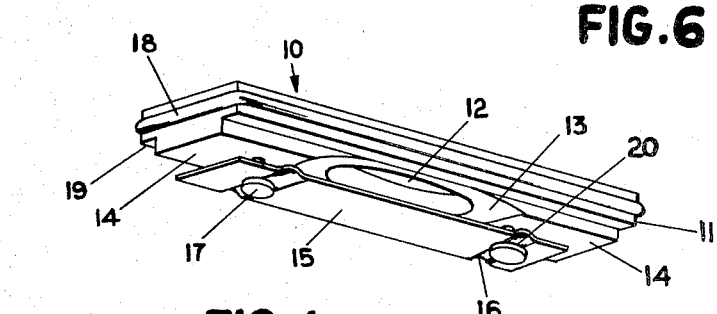
FIG. 1 is a bottom oblique view of a valve unit of the present invention.

Referring specifically to FIG. 1, a bottom oblique view of a valve unit 10 of the present invention is shown. The valve unit body 11 has a central aperture 12 therethrough and a concave valve seat 13 surrounds this aperture. Bosses 14 depend from body 11 at both ends of concave valve seat 13. The bosses are at each end of the valve body. The side edges of the bosses are preferably spaced from the longitudinal edges of the body 11. Between the bosses the lower face of the body is formed into the long shallow concavity forming the valve seat 13.

Thin resilient valve member 15 is movably supported adjacent valve seat 13 by support means 17 which can be any suitable fasteners, pins, drive screws, etc., so long as the ends of the valve member are free to slide lengthwise on their stems or shafts in response to the flexing of the valve. Valve member 15 may be made of any lightweight resilient material which also has sufficient strength to withstand the pressures exerted against it when it is in the sealing or closure position and to resist shifting to closed position until a predetermined pressure differential across the valve exists. The material should also be resistant to fatigue failure resulting from frequent flexing as the valve opens and closes. A suitable material for this member is a thin spring steel. Valve member 15 is free to collapse and to conform to the concavity of valve seat 13 since the openings 20 are over-size with respect to the support means 17. Preferably, slight ribs or fulcrum crimps 16 are provided near both ends of valve member 15 to minimize friction against bosses 14 when the valve member is flexed against valve seat 13 or released to shift to its open position. The width of valve member 15 must be such as to completely cover the central aperture 12 to form an effective seal and with enough overlap on concave valve seat 13 to support the valve member when it is in the air sealing position. The concavity of valve seat 13 improves the air seal attained when valve member 15 is in the closed position.

Around the periphery of body 11 is sealing gasket 18 which can be, for example, an elastic O-ring. This gasket forms a seal between the valve unit and the grid surrounding the air passages in the palletizer lifting head and can be held in place in the valve body by positioning it in a peripheral groove 19 around body 11. FIGS. 2, 3 and 4 more clearly illustrate the construction of valve unit 10.

Figure 5:
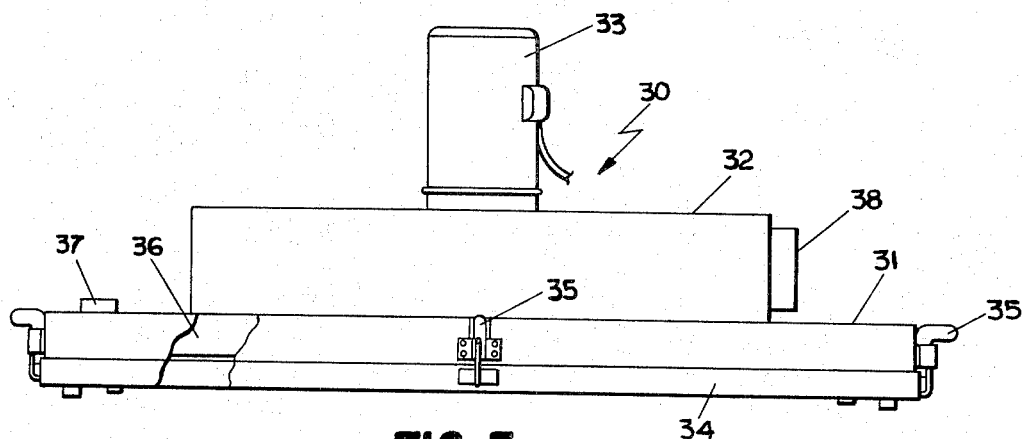
FIG. 5 is a side elevational view of a vacuum operated lifting head.

In FIG. 5, a side elevation view of a vacuum operated lifting head 30 is shown. This head consists of a rectangular frame 31, an air pump or blower chamber 32 and a motor 33 for the blower. Clamped to the lower edge of the frame 31 is a detachable subframe 34. The attachment is made by the fasteners 35. It will be understood that the top of the frame 31 is closed except for the opening into the blower chamber 32 and a relief port 37. This forms a primary chamber 36 above the subframe 34. The relief port 37 communicates with the primary chamber. Air exhausted by the fan or blower exits via the blast port 38 which is equipped with a closure gate. All of the preceding structure is conventional and further description of it is unnecessary.

It will be understood that in the palletizer assembly, the entire head is mounted by suitable means by which it can be raised and lowered and, in addition, has means to guide it for both vertical and horizontal movement. This again is conventional, forms no part of the invention and, therefore, is not illustrated.

Figure 6:
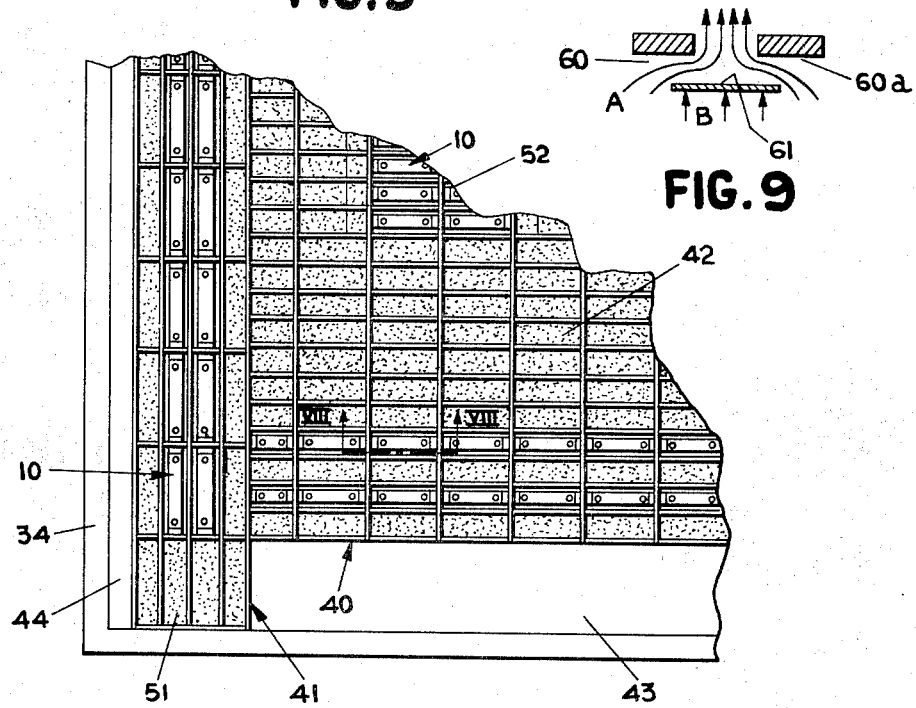
FIG. 6 is a fragmentary, bottom view of one quadrant of the lifting head of FIG. 5 equipped with valve units of the present invention.

One quadrant of the lower face of the lifting head is illustrated in FIG. 6 which shows the subframe 34 and a main grate 40, having on its side an auxiliary grate 41. The grates form a back stop for articles held against the head by air pressure differential. The main and auxiliary grates are formed of bars of rectangular cross section which intersect to form a rigid structure characterized by a plurality of individual air passages or openings 42 of generally rectangular shape. That portion of the lower face of the head not occupied by the main and auxiliary grates is closed off as by the closure plate 43 and the closure strip 44.

It will be recognized that other constructions could be utilized for the grate. For example, it could be a single sheet of material with the depending structure supplied by the bars formed by sharply defined depending ridges surrounding the recesses. The sheet material would have an air passage in each of the recesses. Irrespective of whether this member is constructed as the grate illustrated or made in some other manner, it is a perforate member which forms a stop for the articles and provides numerous individual air passages opening into the primary chamber.

Referring first to the auxiliary grate 41 (FIG. 6), it will be noted that all of the openings 42 in the central portion of this grate are occupied by valve units 10, one in each of the openings. At the end of the grate and on each side of the valve units, the openings are closed by seals 51. The seals 51 are formed of a suitable material such as a foam rubber which is compressible and project beyond the face of the grate for contact with articles. These seals prevent flow of air parallel to the face of the grate between the grate and the articles of the tier. The seals 51 collectively form gaskets which isolate the valved openings or air passages from those which are not valved. It will be noted that a similar arrangement is provided along the side of the main grate 40.

Arranged in the center 52 of the grate 40 are additional valve units 10. The purpose of these will be explained more fully hereinafter. Except in the areas where either the gaskets 51 or the valve units 10 are provided, the openings 42 in the grate are free of obstruction, permitting air to pass through the grate into the primary chamber 36 under the inducement of the fan. When the fan is operating and the blast port is open, there is a differential in air pressure between the air below the grate and that within the primary chamber.

The main grate 40 and the auxiliary grates 41 are both seated within the subframe 34 and below the main frame 31 and, thus, below the primary chamber 36.

Since each valve unit 10 is a separate, self-contained assembly occupying only one of the openings 42, they can be arranged in various patterns within the grates, and the number employed can be limited to those necessary to satisfy the operating circumstances of the lifting head. The valve units 10 are easily inserted in any of the grate openings 42 by applying slight pressure to wedge the sealing means 18 against the grate wall surrounding the openings 42 and can be easily pulled out and eliminated or relocated as needed. FIG. 7 is an oblique view of a portion of the top of grid 40 illustrating crimps 45, the purpose of which is to form stops to keep the valve units 10 from being drawn upward out of position from the grate due to the vacuum suction. Any other suitable restraining means could be employed as well. FIG. 8 illustrates a valve unit 10 properly positioned in an opening 42 of grate 40 and seated against crimps 45.

In the particular arrangement illustrated in FIG. 6, a pattern of the valve units 10 is arranged about the perimeter of the opening in the head. The fact that along one side, the rows of valves are arranged in side-by-side relationship and along the other side each row is spaced from the adjacent row by a row of seals 51 is illustrative only. Any other pattern arrangement suitable to the operating circumstances of the head could be utilized.

The valve units at the center 52 of grate 40 are located to coincide with the chimneys which may be formed in the tier patterns to be employed.

OPERATION OF THE INVENTION

The head 30 is lowered until the grate and the seals 51 contact the articles of the tier. The seals 51 project slightly beyond the bottom face of the grate to have an effective sealing action against the articles. This gasket forming action may be further increased by having the rows of seals projecting progressively greater distances from the grate, the more remote the seals are from the center of the grate. This is particularly important in effecting a seal adjacent the edge of the tier where the top of an article may slope downwardly away from the grate. In this type of situation, the greater projection of the peripheral seals will assure an effective barrier to lateral air flow. This will enable even those air passages at the periphery of the tier to exert full lifting capacity on the articles. When a number of air passages are so affected, the result is a marked increase in the efficiency of the equipment.

With the fan operating and the blast gate open, contact between the grate and the articles immediately closes off the air flow through those of the openings covered by the articles. Until this happens, the air pressure differential across the grate, even with the fan operating and the blast gate open, is not enough to cause the valve units 10 to close because the total number of air passages to openings in the grate by which air can enter the primary chamber provides an air flow capacity of sufficient volume that the air pressure differential required to close the valves cannot be obtained. However, the closing of a number of the openings by the articles upsets this balance and the air pressure differential across the grate increases sharply. As a result, those valve units located in grate openings which remain unobstructed are caused to collapse or shift to close/position and thus shut off the air flow. However, a valve unit seated in an opening which is entirely closed off by an article remains open because the air pressure differential remains too small to close it.

In situations in which the article only partially obstructs the opening, the reaction of the valve unit will depend upon the degree to which the obstruction is effective in reducing the air flow. The particular air pressure differential at which the valve units will close can be varied in several ways such as by selection of the stiffness of the material used in making the valve member. This can be controlled, for example, by the particular alloy used or by selection of a thinner or thicker material. The maximum vacuum which can be generated in the primary chamber will of course be determined by the capacity of the fan. A fan which can generate a differential of 25–26 inches of water has been found satisfactory. It has also been ascertained that a valve designed to close when the pressure differential between the valve and valve member reaches 11 inches of water will close, if the effective air intake area to the opening is reduced to 0.2 of a square inch of effective air intake area when the vacuum in the primary chamber has a value of approximately 20 inches of water.

It is desirable that the valve remain closed unless a substantial portion of the opening is obstructed by an article. However, once the obstruction is such that the threshold pressure differential is not attained, the valve must remain open. Otherwise, insufficient openings will remain operative to retain the peripheral articles against the grate. It is at this point that the gaskets formed by the seals 51 become important. They form an effective seal against the articles. Those of the openings closed by articles and within areas surrounded by the gaskets will generate maximum air pressure differential between ambient and the primary chamber and thus maximum lifting capacity.

Figure 9:
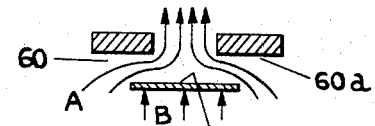
FIG. 9 is a schematic view illustrating the operation of a valve unit of the present invention.

The principle of operation of the individual valve units is illustrated in FIG. 9. The valve member in the open position creates a pair of air passages 60 and 60a (FIG. 9), one on each side. The flow of air through these passages is indicated by the arrows A. As the pressure differential between the primary chamber and the air passage increases, the velocity of the air increases as it bypasses the valve through the passages 60 and 60a. As the pressure differential increases, the unbalance between the pressure acting against the upper face 61 of the valve and that acting against the lower face of the valve (arrows B) increases. When this pressure differential reaches a certain level, the resistance of the valve member 15 to collapse is overcome and the valve closes by conforming to the concave valve seat 13. When the pressure differential falls below a certain level, the valve member 15 will automatically snap open.

To release the load, the gate on the blast port 38 is closed. This immediately reduces the fan's air pumping capacity and the pressure differential between the primary chamber and the air passages decreases. This effect can be accelerated by opening the relief port 37 to bleed air into the primary chamber. When the air pressure differential drops below than necessary to support the tier of articles, they will be released.

Selection of a pressure differential value for effecting closure of the valve depends upon various design factors and the operating circumstances of the lift head. It is important that the valve not be so sensitive that it fails to stay open when the air passage is blocked by the presence of an article since this could seriously impair the lifting capacity of the head. It also must close when any significant portion of air passage remains unobstructed.

The invention provides inexpensive, mass producible valve units which are adapted to be easily inserted in the grids of palletizer vacuum lifting heads which permit the lifting head to automatically adjust itself to accommodate a wide variety of load shapes and sizes. They also permit the use of a fan having only that capacity necessary to lift a tier of articles when substantially the entire bottom of the head is blocked off by articles because this is the condition which exists when the valve units are closed even though only a portion of the lower face of the head is covered by the articles. Reducing the capacity of the fan reduces the initial cost, operating cost and the noise incident to its use. Further, irrespective of fan capacity, it permits much greater variation in load size and shape than is possible without the valves. The fact that the valve units can be easily inserted and removed from the lifting head grids, minimizes the number of valve units required to adapt a lifting head to accommodate varying tier geometries as well as eliminating the need to manufacture lifting head grids with permanent valves mounted therein, each having to be customized to accommodate the intended range of tier geometries. Further, each valve being a complete operative assembly, the invention permits the modification of existing lifting heads to variable load capacity by the installation of valves incorporating this invention.

While a preferred embodiment of the invention, together with certain modifications have been shown and described, it will be recognized that other modifications can be made within the principles of the invention.

The embodiments of the invention in which an exclusive property is claimed are defined as follows.

1. A valve unit adapted for insertion in an air passage opening through the grid of a vacuum operated palletizer lifting head comprising: a rectangular body having a pair of elongated faces on opposite sides thereof and a generally central aperture therethrough between said faces to permit air to pass through the body; said body having in one of said faces thereof a concave valve seat surrounding said aperture; a valve member and means movably supporting the same on said body adjacent said valve seat, said valve member being a thin resilient element adapted to be flexibly shiftable between an open position spaced from said valve seat and a closed position seated against said valve seat shaped to conform to the concavity thereof; and means around the periphery of said body for forming a seal between said body and said grid.

2. A valve unit of claim 1 wherein said valve member has fulcrum crimps near each end thereof which contact said body when said valve member flexes between said open and closed positions to minimize friction between said valve member and said body.

3. A valve unit of claim 2 wherein said valve member is generally rectangular in configuration with openings near each end thereof, said support means passing through said openings and said openings being oversize with respect to said support means.

4. A valve unit of claim 3 wherein said valve member is made of spring steel.

5. A valve unit of claim 4 wherein said means around the periphery of said body comprises a resilient O-ring.

6. A valve unit for automatically regulating the intake of air by the vacuum lifting head of a palletizer through one of the individual air intake passages of said head, said valve unit comprising: a body having a main portion with an upper and a lower face and a boss depending from said lower face thereof; that portion of said boss adjacent the center of said body being formed into an elongated concave valve seat; an aperture extending through said body between said upper and lower faces and generally centered with respect to said concave valve seat; said valve seat extending outwardly from said aperture in all directions; a thin flexible valve member and means at each end of said valve seat supporting said valve member on said body; said valve member being shiftable from an open position spaced from said valve seat to a closed position pressed to said valve seat and conforming to its concave shape; and a resilient sealing gasket surrounding said body and projecting outwardly therefrom.

* * * * *